(12) United States Patent
Kotov et al.

(10) Patent No.: US 7,438,953 B2
(45) Date of Patent: Oct. 21, 2008

(54) PREPARATION OF THE LAYER-BY-LAYER ASSEMBLED MATERIALS FROM DISPERSIONS OF HIGHLY ANISOTROPIC COLLOIDS

(75) Inventors: Nicholas A. Kotov, Stillwater, OK (US); Zhiyong Tang, Stillwater, OK (US); Arif A. Mamedov, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 0 days.

(21) Appl. No.: 10/457,024

(22) Filed: Jun. 6, 2003

(65) Prior Publication Data
US 2004/0038007 A1    Feb. 26, 2004

Related U.S. Application Data
(60) Provisional application No. 60/387,101, filed on Jun. 7, 2002.

(51) Int. Cl.
*B05D 1/18* (2006.01)
(52) U.S. Cl. .................... 427/430.1; 427/314; 427/2.1; 427/171; 427/299
(58) Field of Classification Search ................ 428/34.1; 427/430.1, 314, 2.1, 171, 299
See application file for complete search history.

(56) References Cited
U.S. PATENT DOCUMENTS
5,518,767 A * 5/1996 Rubner et al. ............... 427/259

(Continued)

FOREIGN PATENT DOCUMENTS
WO    WO 00/44507    8/2000

(Continued)

OTHER PUBLICATIONS

Rogach A. et al.: "Nano- and Microengineering: Three-dimensional Colloidal Photonic Crystals Prepared from Submicrometer-sized Polystyrene Latex Spheres Pre-coated with Luminescent Polyelectrolyte/Nanocrystal Shells" *Advaces Materials*, VCH Verlagsgesellschaft, Weinhein, DE, vol. 12, No. 5, Mar. 2, 2000, pp. 333-337, XP000919773.

(Continued)

*Primary Examiner*—Michael C Miggins
(74) *Attorney, Agent, or Firm*—Fellers, Snider, Blankenship, Bailey & Tippens

(57) ABSTRACT

A method for the assembly of a thin film containing highly anisotropic colloids that includes the steps of immersing a substrate in a first solution or dispersion comprising a first substance, wherein the first substance has an affinity for the substrate. Then, immersing the substrate in a second solution or dispersion comprising a second substance, wherein the second substance has an affinity for the first substance. A least one of the first substance and the second substance is a highly anisotropic colloid having at least one dimension differing from the others by a ratio of at least 1:1.5. The method incorporates highly anisotropic colloids using a layer-by-layer process that circumvents the tendency for separation of nanotubes at high nanotube loadings. Additionally, the method incorporates aligned highly anisotropic colloids and provides a method for carbon nanotube alignment, which among other advantages makes possible the preparation of unique criss-crossed composites.

41 Claims, 3 Drawing Sheets

U.S. PATENT DOCUMENTS

| | | | | |
|---|---|---|---|---|
| 5,769,996 | A | * | 6/1998 | McArdle et al. ......... 156/272.4 |
| 6,022,590 | A | | 2/2000 | Ferguson et al. ............ 427/354 |
| 7,225,082 | B1 | * | 5/2007 | Natan et al. .................... 702/27 |
| 2001/0046564 | A1 | * | 11/2001 | Kotov ..................... 427/430.1 |
| 2004/0053037 | A1 | | 3/2004 | Koch et al. ................. 428/323 |

FOREIGN PATENT DOCUMENTS

WO      WO 01/72878 A1      10/2001

OTHER PUBLICATIONS

Grant etal., "Layer-By-Layer Assembly of Collagen Thin Films: Controlled Thickness and Biocompatibility," *Biomedical Microdevices*, 2001, pp. 301-306, vol. 3, No. 4, Publisher: Kuwer Academic Publishers.

Mamedov et al., "Molecular Design of Strong Single-Wall Carbon Nanotube/Polyelectrolyte Multilayer Composites," *Nature Materials*, 2002, pp. 190-194, vol. 1, Publisher: Nature Publishing Group.

Mendelsohn et al., "Fabrication of Microporus Thin Flims from Polyelectrolyte Multilayers," *Langmuir*, 2000, pp. 5017-5023, vol. 16, Publisher: American Chemical Society.

Rogach et al, "Layer-by-Layer Assembled Films of HgTe Nanocrystals with Strong Infrared Emission," *Chem. Mater.*, Jun. 2, 2000, pp. 1526-1528, vol. 12, Publisher: American Chemical Society.

Rogach et al., "Raisin Bun-Type Composite Spheres of Silica and Semiconductor Nanocrystals," *Chem. Mater.*, Jun. 27, 2000, pp. 2676-2685, vol. 12, Publisher: American Chemical Society.

* cited by examiner

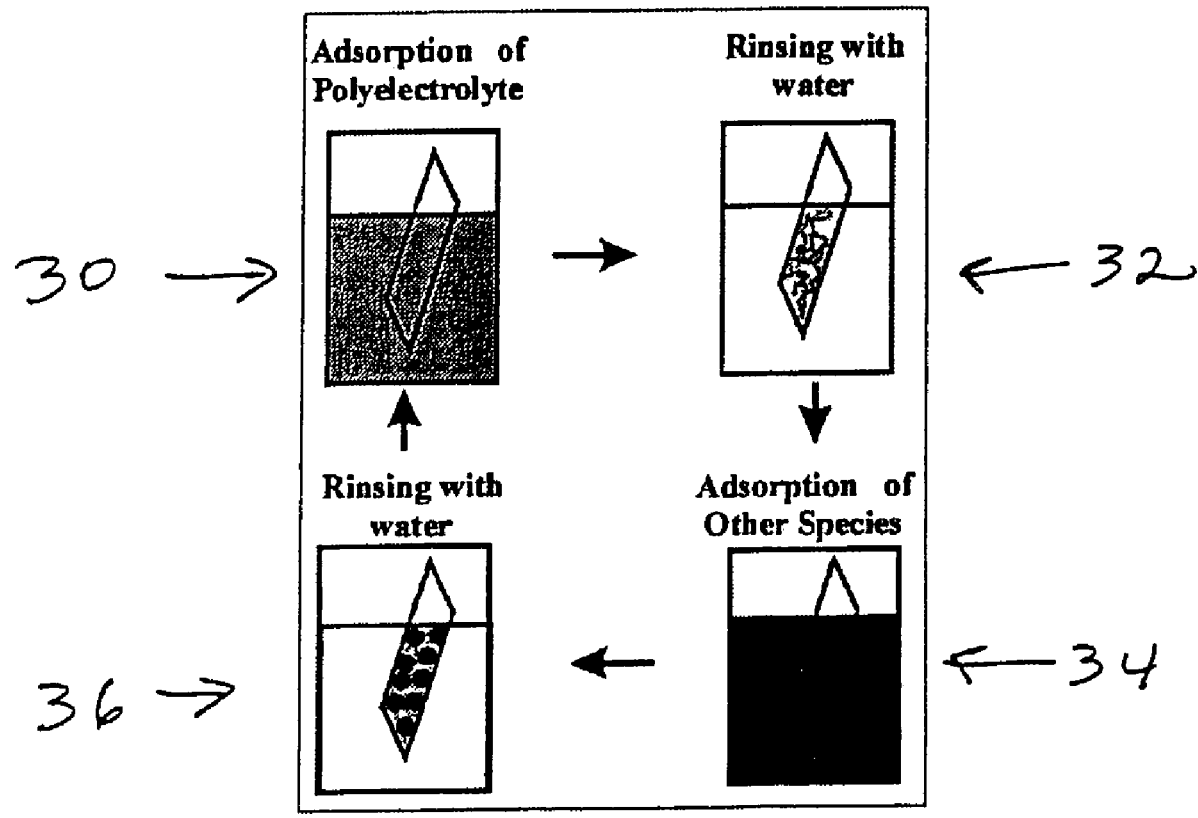
FIG. 3. Model LBL film structure: 1 - polyelectrolyte, 2 - proteins, 3 – particles or different proteins.

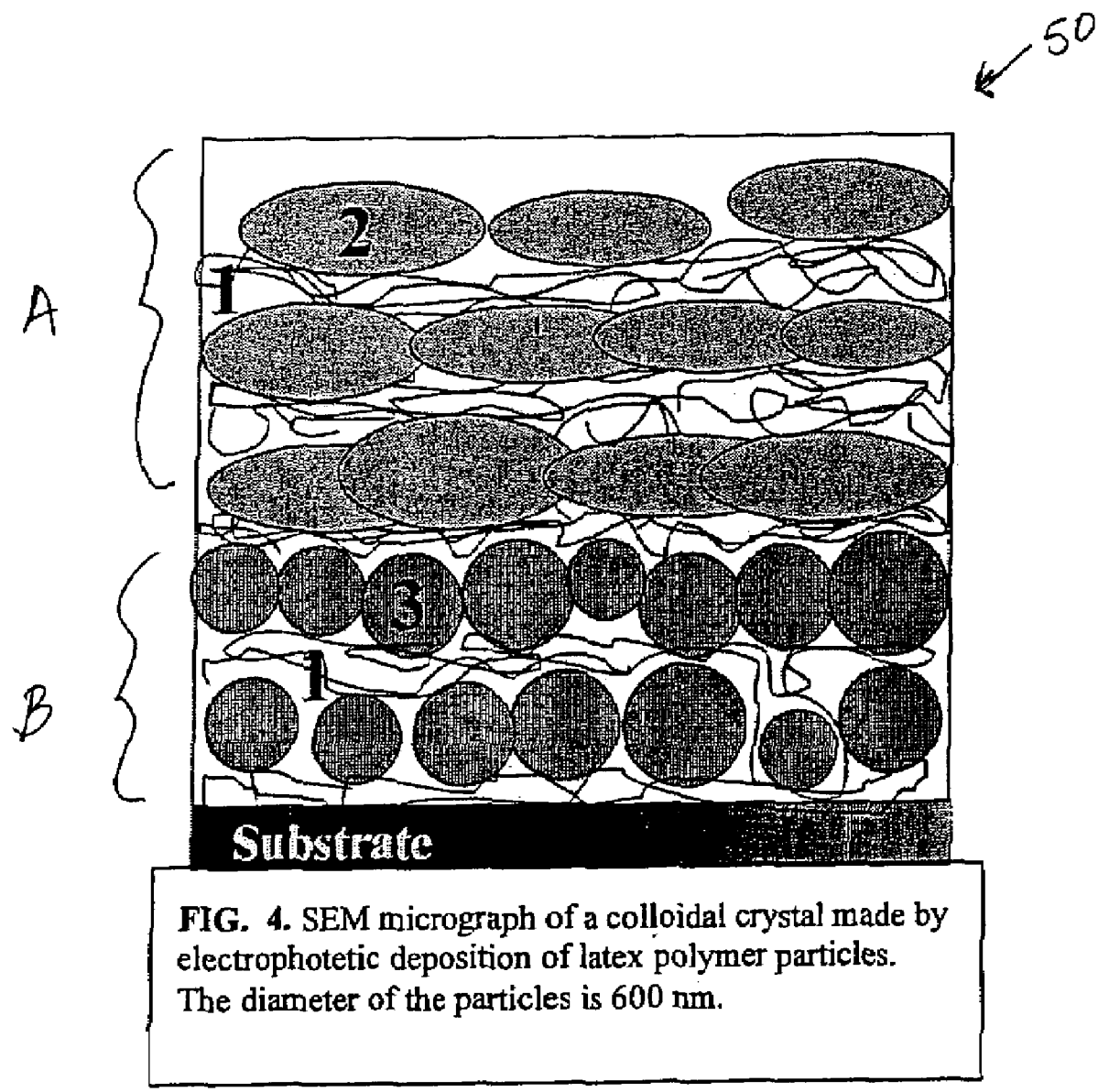
FIG. 4. SEM micrograph of a colloidal crystal made by electrophotetic deposition of latex polymer particles. The diameter of the particles is 600 nm.

PREPARATION OF THE LAYER-BY-LAYER ASSEMBLED MATERIALS FROM DISPERSIONS OF HIGHLY ANISOTROPIC COLLOIDS

CROSS REFERENCE TO RELATED APPLICATION

This application claims the benefit of U.S. Provisional Application No. 60/387,101, which application was filed with the Patent and Trademark Office on Jun. 7, 2002.

STATEMENT REGARDING FEDERALLY SPONSORED RESEARCH

The Government of the United States of America has certain rights in this invention pursuant to Grant Nos. BES-0119483 and EDS-9876265 awarded by the National Science Foundation and Grant Nos. F49620-00-C-0058 and F49620-02-1-0279 awarded by the Air Force Office of Scientific Research.

BACKGROUND OF THE INVENTION

1. Field of the Invention

This invention relates generally to composites made by layer-by-layer assembly materials from dispersions of highly anisotropic colloids.

2. Background

Nanoscale dispersions have been investigated as new materials for traditional electronic and optical applications, chemical and biological sensors, and as building blocks for conceptually novel molecule-based devices. In many applications, nanoscale dispersions are used as composite materials whose properties, among other factors, can be controlled by the aspect ratio of the particles in dispersion. As used herein with respect to a particle, the term "high aspect ratio" refers to a non-spherical species having at least one dimension differing from the others by a ratio of at least 1:1.5. An increase of the particle anisotropy can lead to new quantum mechanical effects in the nanoscale dispersions as well as to improved mechanical, optical and electrical properties of the composite materials made from the nanoscale dispersions. The preparation of such composites and their applications differ significantly from nanoscale dispersions and also differ significantly from layer-by-layer assembly of spherical or low-anisotropy colloids.

Examples of such composites from highly anisotropic materials include composites prepared from metal and semiconductor nanorods and carbon nanotubes. These composites are expected to have much higher diffusion rates of charge carriers through the composites and significantly improved mechanical strength. However, preparation of such composites, especially from carbon nanotubes, is a longstanding and difficult problem due to poor miscibility of high aspect ratio particles with other compounds such as polymers. Although miscibility can be partially improved by surface modification of the nanotubes and other means, a tendency for separation still occurs at high nanotube loadings. Alignment of carbon nanotubes in the polymer matrix leads to substantial improvement of electrical, mechanical, and optical properties.

Thin film technology, wherein inorganic particles with sizes on the order of 1-100 nm are arranged in layers to form a film, is being used presently for an increasingly large number of different technological applications, including, among other things, information storage systems, chemical and biological sensors, fiber-optical systems, magneto-optical and optical devices, pervaporation membranes, protective coatings and light emitting diodes. Current techniques for preparing such films include chemical vapor deposition (in which no discrete inorganic particles are involved), sol-gel technology (producing porous materials that can be sintered to get uniform films), or deposition from colloidal dispersions (spin-coating, dip-coating, Langmuir-Blodgett deposition, etc.). Layer-by-layer assembly (LBL) is a method of thin film deposition, which is often used for oppositely charged polymers or polymers otherwise having affinity and has recently been applied to the preparation of thin films of nanoparticles. Its simplicity and universality, complemented by the high quality films produced thereby, make the layer-by-layer process an attractive alternative to other thin film deposition techniques. LBL can be applied to a large variety of water-soluble compounds and is especially suitable for the production of stratified thin films in which layers of nanometer thickness are organized in a specific predetermined order.

It is thus an object of the present invention to provide a method for the assembly of materials that incorporate highly anisotropic colloids using a layer-by-layer process.

It is a further object of the invention to circumvent the tendency for separation of nanotubes at high nanotube loadings.

A further object of the present invention is to provide a method for the assembly of materials that incorporate aligned highly anisotropic colloids using a layer-by-layer process.

A further object of the invention is to provide a method or carbon nanotube alignment, which among other advantages makes possible the preparation of unique criss-crossed composites. The cross-linked bonds may be formed during the deposition of layers, between the deposition of layers and after all desired layers have been deposited or after the film has been removed from the substrate.

The preparation and utilization of ultra strong composites from highly anisotropic colloids is also an object of this invention.

SUMMARY OF THE INVENTION

One aspect of the invention concerns preparation of thin films and bulk materials from organic and inorganic dispersions containing particles with high aspect ratios. Dispersions of high aspect ratio particles can be prepared by synthesis of corresponding colloids in a desirable media or surface modification of pre-made compounds. When a dispersion is made, colloidal particles are adsorbed on a layer of polyelectrolyte, preferably a monolayer or nanoscale layer, supported by a solid substrate. By repeating deposition cycles, multilayer films are created that contain adsorption layers of anisotropic high aspect ratio particles that alternate with layers of polyelectrolytes or other chemical compounds used as partners to the anisotropic high aspect ratio particles. Subsequent to the assembly of a desired number of layers, the multilayer film may be subjected to further chemical and physical processing for purposes of, for example, separating a prepared multilayer film from a substrate or subjecting a prepared multilayer film to mechanical stress.

Much of the interest in carbon nanotube composite materials is for their use as high strength, lightweight materials. Applications in which carbon nanotube composites may have an advantage include those applications in which carbon fiber or glass fiber composites are currently used. These applications include, but are not limited to structural materials in aircraft, automobiles, boats, submarines, and other transport vehicles; sporting equipment such as tennis racquets, golf clubs, and sail boat masts; solar sails; pressurized tanks; and body armor. Such ultra strong composites can be made not only from carbon nanotubes but also from other nanocolloids with high aspect ratio, to produce, for instance analogs of nanostructured artificial nacre.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTION OF THE DRAWINGS

FIG. 3 is a schematic showing the layer-by-layer assembly method.
FIG. 4 is a cross sectional view of a model LBL structure.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Aqueous or other dispersions of high aspect ratio particles can be prepared by (a) synthesis of corresponding colloids in a desirable media, or (b) surface modification of premade compounds by chemical processing, such as derivatization with covalent bonds, adsorption of the polymer, partial oxidation/reduction of the particle surface, recharging with low molecular weight species, ultrasonication and similar processing techniques. Most of these practical implementations of nanotechnology require immobilization of high aspect ratio particles on various substrates in the form of thin films. The high aspect ratio particles can also be used in the form of composite bulk materials that take advantage of unique electrical, optical, magnetic, catalytic, biological and other applications of nanodispersions.

Figure 1:
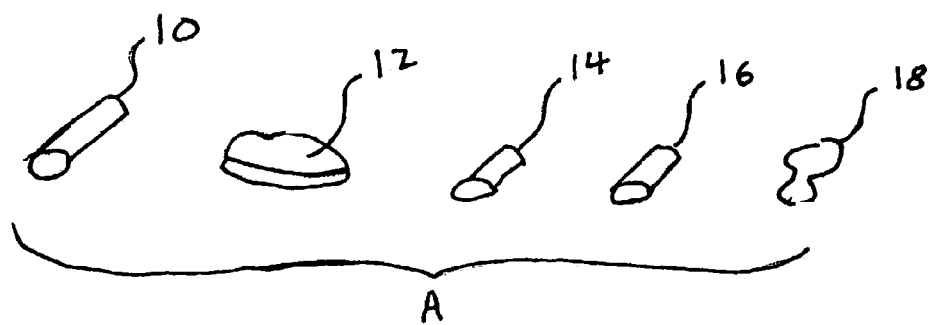
FIG. 1 is a schematic diagram of anisotropic particles having a high geometrical aspect ratio.

Referring now to FIG. 1, among the possible applications, a preferred application involves dispersions made from anisotropic particles with a high geometrical aspect ratio, such as nanorods 10, platelets 12, oxide tubules 14, carbon nanotubes 16, and solid non-spherical latex and polymer particles 18, and others, wherein a particle having a "high geometrical aspect ratio" refers to a non-spherical species having at least one dimension differing from the others by a ratio of at least 1:1.5, more preferably between 1:10 and 1:100, and, most preferably, greater than 1:100. Anisotropic particles having a high geometrical aspect ratio exhibit special properties that can significantly improve the functional properties of various nanomaterials as compared to spherical particles. Examples of improved functional properties include, but are not limited to, improvement of mechanical properties of thin films and membranes resulting from fibrous high aspect ratio particles, improvements in the barrier properties resulting from nanoplatelets, and improvements in charge transfer capabilities resulting from semiconductor/metal nanorods and carbon nanotubes.

Figures 2A, 2B:
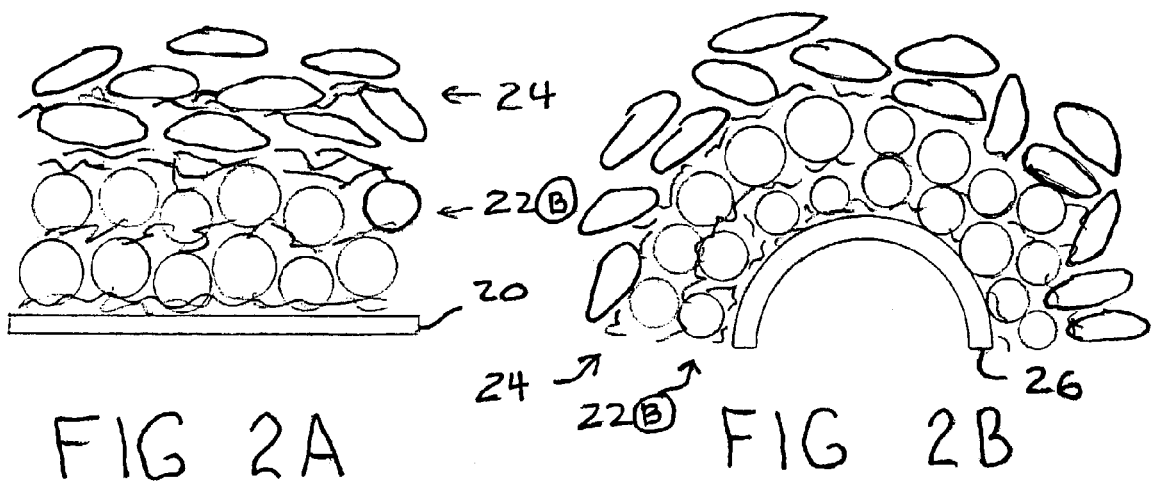
FIG. 2A is a schematic diagram of a flat substrate.
FIG. 2B is a schematic diagram of a curved substrate.

When a dispersion is made, colloidal particles 24 are adsorbed on a (mono)layer of polyelectrolyte 22 supported by a solid substrate. The solid substrate can be a flat plate 20 (FIG. 2A), a highly curved surface 26 (FIG. 2B), a biological organism, a thread, an optical fiber, or other colloidal particles having a larger size. The substrate may additionally be a capsule comprised of a material selected from the group of organic, inorganic, polymeric and biological materials, wherein the capsule has a larger size than the highly anisotropic colloid. In addition to polyelectrolyte, other compounds may be used for (mono)layer 22 that are capable of both adsorbing on the substrate 20, 26 and attracting dispersions from high aspect ratio particles 10, 12, 14, 16, 18 from chosen dispersions. Examples of dispersions include biological substances, structural stabilizing material, single wall carbon nanotubes, multi-wall carbon nanotubes, oxide tubules, metal nanowires, semiconductor nanowires, metal nanorods, semiconductor nanorod, solid non-spherical polymer particles, including particles made of latex, J-aggregates from organic dyes, and nanosheet platelets. For simplicity of notation, anisotropic high aspect ratio particles 10, 12, 14, 16, 18 will be referred to herein as A, while polyelectrolytes or other chemical compounds that make up the (mono)layer 22 used as partners to the anisotropic high aspect ratio particles A in the layer-by-layer assembly (LBL) will be referred to herein as B. Conditions of the adsorption steps of B on the substrates 20, 26, A on the substrates 20, 26, A on B, and B on A can be adjusted to obtain films of high aspect ratio particles A of desirable density and required packing. Additionally, a chemical composition of the dispersion and the structure and molecular weight of the polymer can be adjusted to obtain films having high aspect ratio particles A of desirable density and required packing.

Referring now to FIG. 3, multilayer films containing alternating adsorption layers of A and B can be obtained by cyclic repetition of the following steps: (1) adsorption of A on B, e.g. step 30, (2) rinsing, e.g. step 32, (3) absorption of B on A, e.g. step 34, and (4) rinsing, e.g. step 36, which procedure is set out in detail in PCT Publication WO 00/44507, which publication is incorporated herein by reference. The rinsing may be done with a solvent. One repetition of these four steps shall be referred to herein as a deposition cycle in the LBL process. Optional drying steps can be included between steps. An LBL film 50 (FIG. 4) obtained after n deposition cycles is generically referred to herein as $(A/B)_n$. Affinities of layers on the substrate may result from electrostatic attraction between oppositely charged materials, Van der Waals forces, a combination of attractions or for other reasons. Van der Waals forces include hydrogen bonding, donor-acceptor interactions, dispersive forces, lock and key interactions, stereotactic interactions, hydrophobic interactions, and dipole-dipole interactions to name several examples.

During the film assembly, compounds of A and B may be replaced, at least partially, by some other species, examples of which are provided in WO 00/44507, to obtain multilayers with built-in stratification and/or a property gradient. Graduated properties may include but are not limited to strength, flexibility, index of refraction, emission wavelength and the composition of the material. Additionally, the properties may be varied for applying stress in different regions of the film, to provide increased strength to the substrate, to form one section of a film that has corrosion resistant section, to prevent spalling of the substrate when the substrate is broken, and to prevent shattering of the substrate the substrate is broken. Individual layers of high aspect ratio particles A can be alternated with different particles, e.g., a third substance.

During assembly, various treatments may be applied to induce orientation/ordering of A and B with respect to each other as well as with respect to the substrate. Examples of such treatments include (1) lateral liquid flow along the substrate, (2) external magnetic/electrical field, and (3) patterns applied on the substrate. Ordering by liquid flow may be implemented by carrying out the assembly in a flow cell when the dispersion of the species to be adsorbed is moving along the substrate surface with a controlled rate. The flow cell may be designed as a closed-loop circulation of the dispersion or as a spray aimed at a certain direction to the surface.

The adsorption steps of high aspect ratio species may also be carried out in an external force field, for instance electrical or magnetic fields. The gradient of the field applied in a desirable orientation to the substrate surface will interact with species to be assembled thereby orienting the species according to the force field lines. 2D or 3D Patterning of the substrate surface may be used to affect the orientation of the adsorbed particles. Patterning may be used to achieve preferential assembly on areas with greater affinity to the adsorbing species. The geometry of these areas may be such that it requires the nonspherical species to adsorb in a preferential orientation. The interface between patterned and non-patterned areas or patterns having a different chemical nature may also be a factor affecting the preferential orientation of the adsorbing species.

Subsequent to assembly of a desired number of layers, the entire LBL assembly 40 (FIG. 4) can be subjected to further chemical and physical processing, such as exposure to gases, solutions, force field, etc. Secondary processing steps include separation of the prepared multilayer film from the substrate.

The $(A/B)_n$ multilayers can be separated from the substrate as specified in PCT Publication No. WO 01/72878, which publication is also incorporated herein by reference. After multilayers are separated from a substrate, the membranes thus produced can be further processed by LBL coating or other means. The membranes also can be folded a desirable number of times and/or pressed or compacted to produce a bulk material analog of the ultrathin membrane. Multiple folded thin films may be combined.

Secondary processing may also include subjecting the prepared multilayer film to mechanical stress, thermal treatment or by exposing the film to a solution of different pH, to a solution of a high salt concentration, to a high humidity environment, or to a low humidity environment. For example, stretching of the membrane or stretching of the original $(A/B)_n$ multilayer on a suitable substrate will lead to a (re) alignment of high aspect ratio particles. Such stretched materials are expected to have significantly different mechanical, optical, and electrical properties than unstretched ones. Thermal treatment of the multiplayer can result in crosslinking of the material, which further increases the strength and toughness of the composite. Crosslinking may also be accomplished by exposing the film to a chemical agent, such as glutaraldehyde, exposing the film to ionizing radiation, ultraviolet radiation, and visible radiation.

The prepared multilayer materials from high aspect ratio particles prevent phase separation because each new adsorption significantly reduces the mobility of the previous adsorption, and therefore, the composition and packing of each layer is controlled by deposition conditions.

The preferential implementations of the proposed technique includes preparation of the LBL multilayer 40 from carbon nanotubes, II-VI semiconductor nanorods and nanowires, noble metal nanorods, and J-aggregates from organic dyes, platelets and similar compounds.

The thin films formed by the above described process may be used for a variety of applications, which include but are not limited to incorporation into a filtration membrane, the use of oxide tubules to store materials for later release, such as anti-corrosion chemicals, anti-biological warfare agents, anti-chemical warfare agents, resin repair reagents, or drugs to be delivered. Additionally, the thin films may be incorporated into optical materials with birefringence, non-linear optical materials biomedical coatings, to form biomedical implants such as replacement ligaments, artificial vessels, or coating on artificial joints. Further, the thin films may be made of electrically conductive anisotropic nanoparticles for signaling, fault detection, electromagnetic shielding, sensing mechanical stress, or actuators.

The present invention will be further understood with reference to the following non-limiting experimental examples.

EXAMPLE 1

Carbon nanotubes, both single-wall (SWNT) and multi-wall (MWNT), are significantly stronger than carbon fiber. For example, the range of tensile strength values of nanotubes is 11-63 GPa, while for carbon fibers it is measured to be around 3.5 GPa. Incorporation of carbon nanotubes in a polymer matrix should result in greater mechanical performance of composite material. However, previous attempts to obtain such composite materials resulted in strong separation of the polymer and carbon nanotube phases, which led to premature mechanical failure. This is primarily attributed to poor polymer matrix-SWNT connectivity. Both problems can be successfully mitigated when the SWNT composite is made following a protocol of layer-by-layer assembly. Nanometer-scale uniform composites with SWNT loading as high as 50% can be obtained. Freestanding SWNT/polyelectrolyte membranes delaminated from the solution were found to be exceptionally strong.

SWNTs having an aspect ratio of approximately 1:1000 were manufactured by laser vaporization of carbon rods doped with Co, Ni and FeS in an atmosphere of $Ar:H_2$. A suspension of SWNT raw material was refluxed in 65% $HNO_3$ and subsequently purified by centrifugation. Supplemented by sonication, this treatment results in the partial oxidation of about 5% of the total number of carbon atoms both in the caps and walls of SWNT. The presence of carboxylic acid groups allows the preparation of metastable SWNT dispersions after 1 min of sonication in deionized water without any additional surfactant. These negatively charged SWNTs with a zeta-potential of −0.08 V can be assembled layer-by-layer with positively charged polyelectrolyte, such as branched poly(ethyleneimine), of molecular weight Mw=70,000. Because the overall negative charge of the SWNT used here was fairly small, after every fifth deposition cycle, a layer of SWNT was replaced with a layer of poly(acrylic acid) (PAA,Aldrich),Mw=450,000. These additional layers improve the linearity of the deposition process, and present a convenient chemical anchor for subsequent chemical modification. For the same reasons, a single PEI/PAA bilayer was deposited on a bare glass or silicon substrate before the SWNT assembly. All solutions were made in 18 MOhm deionized water. Deionized water was also used for rinsing at pH 8.5 adjusted by NaOH. Wafers/glass slides were cleaned in piranha solution (a 1:3 mixture of 30% $H_2O_2$ and concentrated $H_2SO_4$; note that this mixture is dangerous as it violently reacts with organics), rinsed with deionized water, sonicated for 15 min and again thoroughly rinsed with deionized water. They were then coated with a precursor layer: PEI (10 min)+PAA (15 min, pH=3), followed by the deposition of (PEI/SWNT)$_5$. The 1% PEI solution was at pH 8.5; 1% PAA solution was at pH=6 (pH=3 for wafer coating); SWNT solution was at pH=6.8. The layer sequence of (PEI/PAA)(PEI/SWNT)$_5$ was repeated until a desirable thickness was obtained. Exposure times of 10 and 60 min were used for polyelectrolytes and SWNT baths, respectively. The assembly conditions of the entire procedure (such as pH, ionic strength and concentrations) were optimized so that the dipping cycles could be repeated as many times as needed with linear growth of the multilayers. This enables the preparation of films with any desirable thickness and architecture tailored to different applications. Multilayer stacks with a cumulative structure of ((PEI/PAA)(PEI/SWNT)$_5$)$_6$ and ((PEI/PAA)(PEI/SWNT)$_5$)$_8$ containing 30 and 40 (PEI/SWNT) bilayers, respectively, were typically used in this study.

Similar to other polyelectrolyte LBL systems, an interdigitated layer of SWNT is deposited in each deposition cycle. The final morphology of the multilayers can be described as a mixture of individual carbon nanotubes and their 4-9 nm bundles intricately interwoven together in a fine fabric. Structurally, it is preferred that SWNT uniformly covers the entire surface of the substrate without any evidence of phase separation. Also, in the experiments, the presence of oxidized flat graphite sheets, and other forms of carbon colloids, was minimal. Both these factors contributed to the mechanical properties of the composites.

EXAMPLE 2

PEI was used as the LBL partner of SWNT because of the terminal —NH$_2$ and backbone —NH— groups in the main chain and branches, which are suitable for the subsequent chemical modification of the composite. The PEI chains can be either crosslinked with each other or with carboxyl groups on SWNT and PAA. Chemical stitching increases the connectivity of the polyelectrolyte matrix with SWNT, and therefore the load transfer in the composite. A combination of both modification pathways are used. Partial covalent SWNT-PEI-PAA crosslinking was achieved by heating the films to 120° C. after the deposition of each layer, resulting in amide bonds between a variety of protonated and non-protonated functional groups of PEI, PAA and SWNT, which complemented the intrinsic ionic crosslinking of the LBL films. Subsequently, the film was crosslinked in 0.5% glutaraldehyde (OCHCH$_2$CH$_2$CH$_2$CHO) aqueous solution for 1 h at room temperature. To remove unreacted glutaraldehyde, the film was rinsed with tap water for 3×10 minutes and then with deionized water for the same period. This reaction produces a tight network of polymeric chains and nanotubes connected by dialdehyde linkages. It was found that if only 1% of all carbon atoms of SWNT are chemically bonded to the polymer matrix, such crosslinking drastically increases the sheer between them by an order of magnitude. Therefore, a 5% density of —COOH groups on the SWNT surface described above should be sufficient to obtain good connectivity with the polyelectrolyte matrix.

EXAMPLE 3

Carbon nanotubes can be aligned in parallel within the deposited layers. One way to achieve this is to flow the nanotube solution during the deposition step. The alignment procedure was performed for SWNT having a high aspect ratio solutions utilizing a custom made closed loop flow cell equipped with a mini-pump and regulating the flow rate of the solution. It was found that with the increase of flow rate the alignment of tubes is also accompanied by their lateral assembly in ribbons. Such a morphology maximizes both the attraction to the oppositely charged substrate plane and Van-der-Waals forces between the SWNT and is similar to the macroscopic ribbon self-assembly in the liquid flow observed by Vigolo et al. Such anisotropy of nanotube alignment should yield greater mechanical properties of the composite in the direction parallel to the alignment direction.

The parallel alignment of the nanotubes during the layer-by-layer assembly was obtained by using a closed loop laminar flow cell equipped with a mini-pump. The edge of a 1×1 cm silicon wafer, which faced the SWNT dispersion flow, was shaped as shown on in order to avoid turbulence during the LBL deposition. The cleaning procedure, deposition of both the precursor bilayer and the monolayer of PEI-b were performed according to the procedure described above. Subsequently the substrate was transferred into the flow cell. A stream of SWNT dispersion with 0-11 mL/min variable flow rate regulated by a mini-pump, was directed along the substrate surface for 2 hours. Upon finishing the alignment in a flow procedure, the substrate with nanotube assembly was washed with DI water two times for 1 minute each and air dried.

Alignment and orientation of the highly anisotropic colloids can also be obtained spontaneously due to high anisotropy of the adsorbing species. For instance the colloidal platelets will adsorb in parallel to the substrate in every LBL cycle, since this corresponds to the maximum attraction force and greatest decrease of the free energy of the system. Another example is the spontaneous orientation of carbon fibers, semiconductor and metal nanowires in the external magnetic/electrical field. Applied during every LBL cycle such external fields will produce composite with parallel alignment of the anisotropic colloid.

It will be apparent to those skilled in the art that the process herein described for improving the physical properties of a film could be applied to a large variety of thin film assemblies.

While the invention has been described with a certain degree of particularity, it is manifest that many changes may be made in the details of the process of assembly without departing from the spirit and scope of this disclosure. It is understood that the invention is not limited to the experimental methods set forth herein for purposes of exemplification.

What is claimed is:

1. A method for the assembly of a thin film containing highly anisotropic colloids comprising the steps of:
    a) immersing a substrate in a first solution or dispersion comprising a first substance, said first substance having an affinity for said substrate; and
    b) immersing said substrate in a second solution or dispersion comprising a second substance, said second substance having an affinity for said first substance, to obtain at least a two layer thin film; and
    wherein at least one of said first substance and said second substance is a highly anisotropic colloid wherein said colloid comprises rods or tubes having geometric dimensions of length, width and height wherein said length is greater than said width and said height by a ratio of at least 1:1.5.

2. The method of claim 1 wherein:
    said affinities result from an electrostatic attraction between oppositely charged materials.

3. The method of claim 1 wherein:
    said affinities result from van der Waals forces between said substances and said substrate.

4. The method of claim 1 wherein:
    said affinities are due to a combination of electrostatic and van der Waals forces between said substances and said substrate.

5. The method of claim 1 wherein:
    said first substance and said second substance are biological substances.

6. The method of claim 1 wherein:
said first substance and said second substance are structural stabilizing materials.

7. The method of claim 1 wherein:
said at least one of said first and said second substances is a highly anisotropic colloid comprising single wall carbon nanotubes that are soluble or dispersed in a polar solvent.

8. The method of claim 1 wherein:
said at least one of said first and said second substances is a highly anisotropic colloid comprising multi wall carbon nanotubes that are soluble or dispersed in a polar solvent.

9. The method of claim 1 wherein:
said at least one of said first and said second substances is a highly anisotropic colloid comprising oxide tubules that are soluble or dispersed in a polar solvent.

10. The method of claim 1 wherein:
said at least one of said first and said second substances is a highly anisotropic colloid comprising metal nanowires that are soluble or dispersed in a polar solvent.

11. The method of claim 1 wherein:
said at least one of said first and said second substances is a highly anisotropic colloid comprising semiconductor nanowires that are soluble or dispersed in a polar solvent.

12. The method of claim 1 wherein:
said at least one of said first and said second substances is a highly anisotropic colloid comprising metal nanorods that are soluble or dispersed in a polar solvent.

13. The method of claim 1 wherein:
said at least one of said first and said second substances is a highly anisotropic colloid comprising semiconductor nanorods that are soluble or dispersed in a polar solvent.

14. The method of claim 1 wherein:
said at least one of said first and said second substances is a highly anisotropic colloid comprising fibrous high aspect ratio polymers that are soluble or dispersed in a polar solvent.

15. The method of claim 1 wherein:
said at least one of said first and said second substances is a highly anisotropic colloid comprising J-aggregates from organic dyes that are soluble or dispersed in a polar solvent.

16. The method of claim 1 wherein:
a placement and orientation of said highly anisotropic colloid is controlled by patterns applied to said substrate and to interfaces between said patterns.

17. The method of claim 1 wherein:
an orientation of said highly anisotropic colloid is controlled by mechanical stress.

18. The method according to claim 1 wherein:
said first substance and said second substance are organic.

19. The method according to claim 1 wherein said ratio is a ratio between 1:10 and 1:100.

20. The method according to claim 1 wherein said ratio is a ratio greater than 1:100.

21. The method of claim 1 further comprising the step of:
rinsing said substrate with a solvent.

22. The method of claim 2 further comprising the step of:
drying said substrate.

23. The method of claim 21 further comprising the step of:
periodically replacing the solution or dispersion of said first substance with a solution or dispersion comprising of a third substance, said third substance having an affinity for said substrate.

24. The method of claim 1 further comprising the step of:
repeating steps (a) to (b) a predetermined number of times to create a multi-layer film.

25. The method of claim 24 further comprising the step of:
periodically replacing the second solution comprising dispersion of said second substance with a third solution or dispersion comprising a third substance, said third substance having an affinity for said first substance.

26. The method of claim 24 further comprising the step of:
further processing after the deposition of all layers by exposing the film to a solution of different pH.

27. The method of claim 24 further comprising the step of:
further processing after the deposition of all layers by exposing the film to a solution of a high salt concentration.

28. The method of claim 24 further comprising the step of:
further processing after the deposition of all layers by exposing the film to a high humidity environment.

29. The method of claim 24 further comprising the step of:
further processing after the deposition of all layers by exposing the film to a low humidity environment.

30. The method of claim 24 further comprising the step of:
further processing after the deposition of all layers by subjecting the film to mechanical stress after preparation to change physical and/or chemical properties of said film.

31. The method of claim 24 further comprising the step of:
preventing phase separation of said highly anisotropic colloid from polyelectrolytes used in other deposition layers.

32. The method of claim 1 wherein:
said steps of immersion comprise a deposition step; and
an orientation of said highly anisotropic colloid is controlled by a flow of liquid containing said highly anisotropic colloid past said substrate during said deposition step.

33. The method of claim 32 wherein:
said flow takes place in a flow cell that includes an open loop or a closed loop circulator.

34. The method of claim 32 wherein:
said flow is provided by an oriented spray aimed at a desired direction to a surface of said substrate.

35. The method of claim 1 wherein:
an orientation of said highly anisotropic colloid is controlled by a magnetic or electrical field.

36. The method of claim 35 wherein:
said highly anisotropic colloid is sensitive to said magnetic or electric field.

37. The method of claim 1, further comprising the step of:
removing said thin film from the substrate after its preparation.

38. The method according to claim 37 further comprising the step of:
producing a material of desired dimensions by folding said thin film.

39. The method according to claim 38 wherein said step of producing further comprises:
combining multiple ones of said folded thin films.

40. The method according to claim 38 further comprising:
compacting said folded films to produce a bulk analog of said thin film.

41. The method according to claim 40 further comprising:
chemically treating said bulk analog to combine films.

* * * * *